US008607133B2

(12) United States Patent
Zhang

(10) Patent No.: US 8,607,133 B2
(45) Date of Patent: Dec. 10, 2013

(54) DATA PROCESSING DEVICE AND METHOD FOR CHECKING PARAMETER VALUES OF THE DATA PROCESSING DEVICE

(75) Inventor: Le Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 245 days.

(21) Appl. No.: 13/310,708

(22) Filed: Dec. 3, 2011

(65) Prior Publication Data

US 2012/0166919 A1    Jun. 28, 2012

(51) Int. Cl.
G06F 7/02  (2006.01)

(52) U.S. Cl.
USPC .......................................... 714/819; 702/116

(58) Field of Classification Search
USPC .................... 714/819, 803; 702/116
See application file for complete search history.

(56) References Cited

U.S. PATENT DOCUMENTS

| 4,107,649 A * | 8/1978 | Kurihara ........................ 714/703 |
| 4,719,642 A * | 1/1988 | Lucas ............................ 375/249 |
| 5,222,065 A * | 6/1993 | Krogmann .................. 714/38.12 |
| 6,625,527 B1 * | 9/2003 | Ding et al. ................... 701/30.6 |
| 7,228,249 B2 * | 6/2007 | Hartrey .......................... 702/116 |
| 7,751,910 B2 * | 7/2010 | Gross et al. ..................... 700/52 |
| 8,245,562 B2 * | 8/2012 | Dawson .......................... 73/1.61 |

* cited by examiner

Primary Examiner — Steve Nguyen
(74) Attorney, Agent, or Firm — Altis Law Group, Inc.

(57) ABSTRACT

A data processing device acquires a first parameter value of a hardware component, and calculates a first prediction value of the first parameter using a prediction algorithm. If a difference of the first prediction value and the first parameter falls within a deviation range, the first parameter value is determined as a real value and is stored. Otherwise, the device acquires a second parameter value of the hardware component that follows the first parameter value, and calculates a second prediction value of the second parameter value. If a difference between the second prediction value and the second parameter value falls with a second deviation range, the first parameter value is determined as a real value and is stored. Otherwise, the first parameter value is determined as a false value and is abandoned.

12 Claims, 3 Drawing Sheets

DATA PROCESSING DEVICE AND METHOD FOR CHECKING PARAMETER VALUES OF THE DATA PROCESSING DEVICE

BACKGROUND

1. Technical Field

The embodiments of the present disclosure relate to data processing technology, and particularly to a data processing device and a method for checking observed values of the data processing device.

2. Description of Related Art

To ensure a data processing device (e.g., a server) runs in a secure environment, the server will use data acquisition devices (e.g., sensors, voltmeters, tachometers) to detect parameter values of hardware components, such as a voltage and a temperature of a central processing unit (CPU), a rotation speed of a motherboard fan, for example, and control the components based on the parameter values. For example, if the voltage of the CPU exceeds a preset threshold value, the server may send an alarm to clients connected to the server, then power off the server. However, the parameter values may have false values due to faults of the data acquisition devices, and the false values may cause the server to perform wrong operations.

DETAILED DESCRIPTION

The disclosure is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
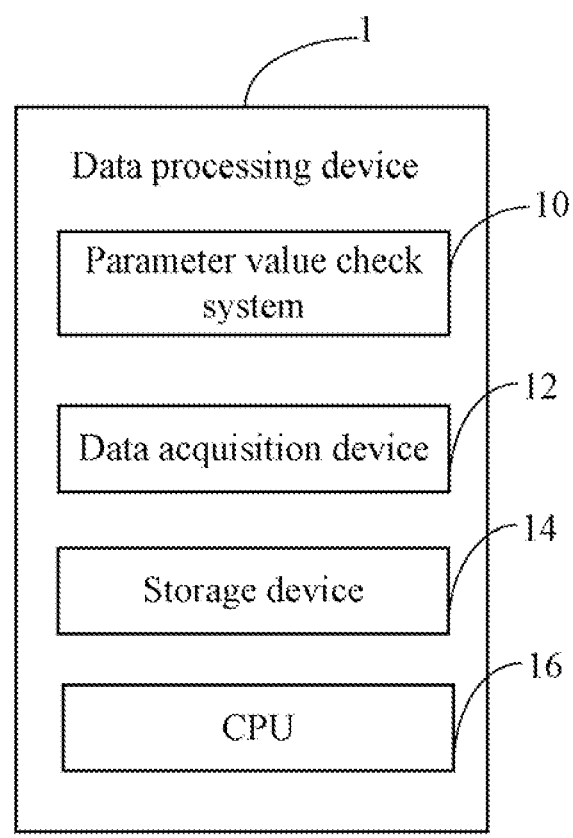
FIG. 1 is a block diagram of one embodiment of function modules of a data processing device including a parameter value checking system.

FIG. 1 is a block diagram of one embodiment of function modules of a data processing device 1. In one embodiment, the data processing device 1 includes a parameter value checking system 10, a data acquisition device 12, a storage device 14, and a central processing unit (CPU) 16. The data processing device 1 may further include more hardware components than shown in FIG. 1, such as motherboards, video cards, graphic cards, hard drivers, fans, power supplies, for example.

In one embodiment, the data processing device may be a client computer or a server. The data acquisition device 12 may be, but not limited to, a temperature sensor, a voltmeter, or a tachometer, which is used to periodically acquire parameter values of hardware components of the data processing device 1. The data processing device 1 may perform corresponding operations based on the parameter values. For example, if a temperature of the CPU 40 exceeds a preset threshold value, the data processing device 1 may automatically power off a power supply. However, the parameter values may have false values due to faults of the data acquisition devices, and the false values may cause the server to perform wrong operations. Therefore, the parameter value checking system 10 is provided to analyze the detected parameter values, recognize and delete false values from the detected parameter values.

Figure 2:
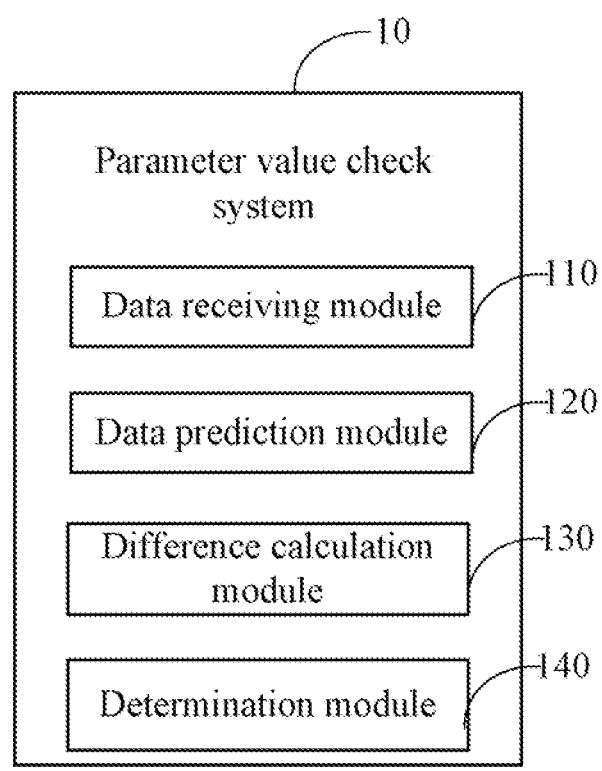
FIG. 2 is a block diagram of one embodiment of function modules of the parameter value checking system.
Figure 3:
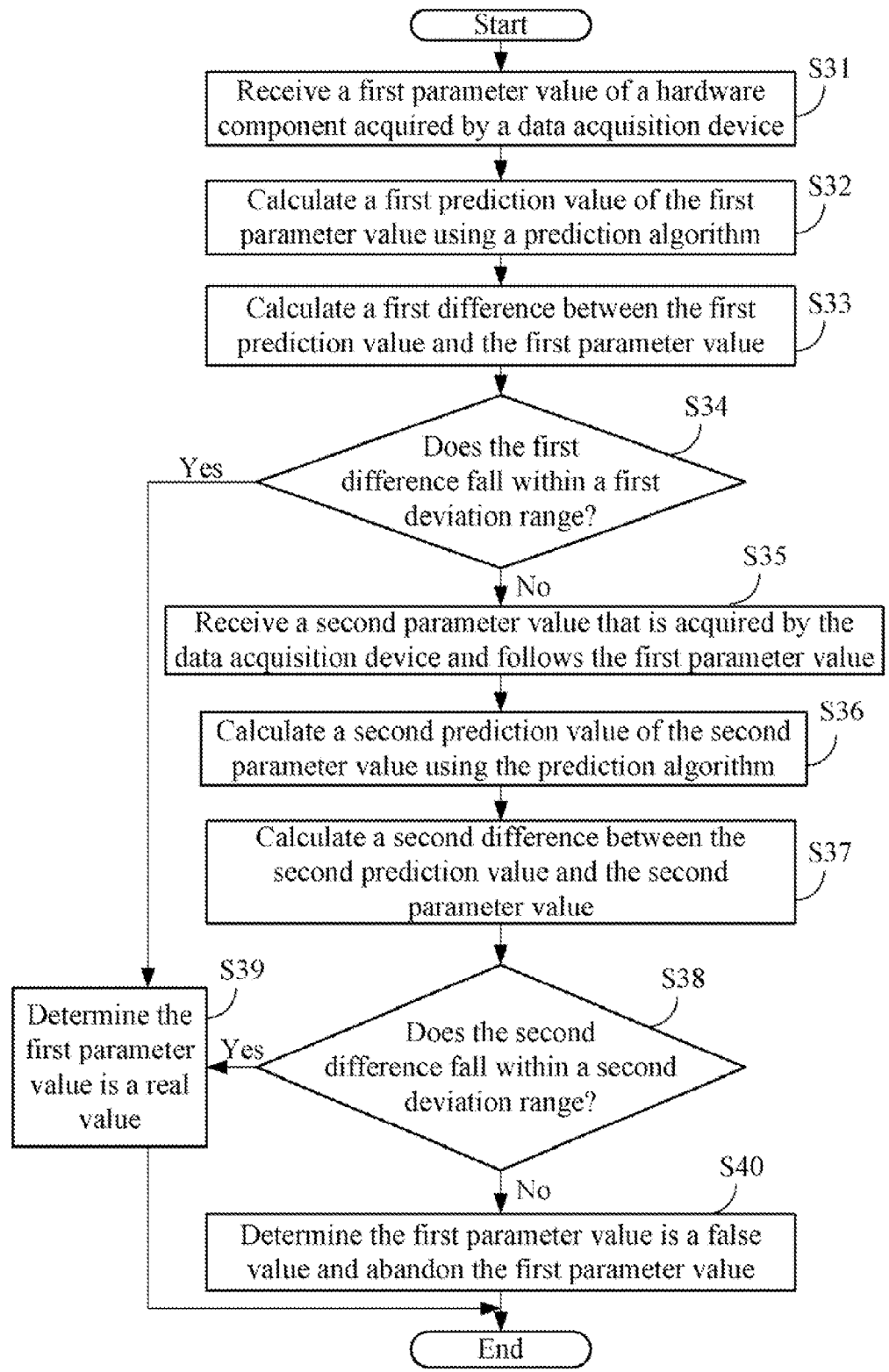
FIG. 3 is a flowchart of one embodiment of a parameter value checking method.

As shown in FIG. 2, the parameter value checking system 10 includes a data receiving module 110, a data prediction module 120, a difference calculation module 130, and a determination module 140. The modules 110-140 may include computerized code in the form of one or more programs that are stored in the storage device 14. The computerized code includes instructions to be processed by the CPU 16 for providing the above-mentioned functions of the system 10. A detailed description of the functions of the modules 110-140 are illustrated in FIG. 3. The storage device 14 may be a cache or a dedicated memory, such as an EPROM, HDD, or flash memory.

FIG. 3 is a flowchart of one embodiment of a parameter value checking method. Depending on the embodiment, additional blocks may be added, others removed, and the ordering of the blocks may be changed.

In block S31, the data acquisition device 12 acquires a first parameter value of a hardware component (e.g., the CPU 16) of the data processing device 1, and sends the first parameter value to the parameter value checking system 10. In this embodiment, the data acquisition device 12 is a voltmeter used to detect voltage values of the CPU 16. The data receiving module 110 receives the first parameter value sent by the data acquisition device 12.

In block S32, the data prediction module 120 calculates a first prediction value of the first parameter value using a prediction algorithm. In one embodiment, the prediction algorithm can be the exponential smoothing method. One simple formula of the exponential smoothing method are as follows:

$$F_1 = x_0;$$

$$F_t = ax_{t-1} + (1-a)F_{t-1};$$

where $\alpha$ is the smoothing factor, $0 \leq \alpha \leq 1$, $t>1$, $x(t)$ is the last parameter value, and $F_{t-1}$ is the last prediction value of the last parameter value. In other embodiments, the prediction algorithm may be the simple moving average method, the weighted moving average method, or any other suitable prediction method.

In block S33, the difference calculation module 130 calculates a first difference between the first prediction value and the first parameter value. For example, the first parameter value detected by the voltage sensor may be 1.4 volts, the first prediction value of the first parameter value may be 1.5 volts, and then the first difference is 1.5 volts-1.4 volts=0.1 volts.

In block S34, the determination module 140 determines if the first difference falls within a first deviation range of the first prediction value. In this embodiment, the first deviation range is a value range dynamically determined according a preset proportion of the first prediction value. For example, if the preset proportion is 5%, then the first deviation range is determined to be more than or equal to 1.5 volts×(−5%), and less than or equal to 1.5 volts×5%, namely [−0.075 volts, 0.075 volts]. In other embodiment, the first deviation range may be a preset fixed value range, such as [−0.1 volts, 0.1 volts].

In block S34, if the determination module 140 determines that the first difference falls within the first deviation range, block S39 is implemented, the determination module 140 determines that the first parameter value is a real value, and stores the first parameter value in a corresponding record that is stored in the storage device 14. For example, if the first difference is 0.1 volts, and the first deviation range is [−0.1 volts, 0.1 volts], the first parameter value 1.4 volts are stored in a temperature record of the CPU 16. If the first difference falls outside the first deviation range, block S35 described below is implemented. For example, if the first difference is 0.1 volts, and the first deviation range is [−0.075 volts, 0.075 volts], block S35 is implemented.

In block S35, the data receiving module 110 receives a second parameter value, which is acquired by the data acquisition device (such as the voltmeter mentioned above) and follows the first parameter value. For example, the second parameter value may be 1.52 volts.

In block S36, the data prediction module 120 calculates a second prediction value of the second parameter value using the prediction algorithm, such as the exponential smoothing method described above. For example, if the smoothing factor α in the formula is 0.5, the first parameter value is 1.4 volts, the first prediction value is 1.5 volts, and then the second prediction value equals 0.5×1.4 volts+(1−0.5)×1.5 volts=1.45 volts.

In block S37, the difference calculation module 130 calculates a second difference between the second prediction value and the second parameter value. For example, if the second parameter value is 1.52 volts, and the second prediction value is 1.45 volts, then the second difference is 1.45 volts−1.52 volts=−0.07 volts.

In block S38, the determination module 140 determines if the second difference falls within a second deviation range of the second prediction value. In this embodiment, the second deviation range is a value range dynamically determined according the preset proportion of the second prediction value. As mentioned above, the preset proportion is 5%, then the second deviation range is determined to be more than or equal to 1.45 volts×(−5%), and less than or equal to 1.45 volts×5%, namely [−0.0725 volts, 0.0725 volts]. In other embodiment, the first deviation range may be the preset fixed value range, such as [−0.1 volts, 0.1 volts]. If the second difference falls within the second deviation range, block S39 described above is implemented. For example, if the second difference is −0.07 volts, which falls within the second deviation range [−0.0725 volts, 0.0725 volts], block S39 is implemented, the first parameter value 1.4 is determined as a real value and is stored into the storage device 14. Otherwise, if the second difference falls outside the second deviation range, block S40 is implemented, the determination module 140 determines the first parameter value is a false value and abandons the first parameter value.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method executed by a processor of a data processing device for checking parameter values of the data processing device, the method comprising:

receiving a first parameter value of a hardware component of the data processing device acquired by a data acquisition device;

calculating a first prediction value of the first parameter value using a prediction algorithm;

determining if a first difference between the first prediction value and the first parameter value falls within a first deviation range of the first prediction value;

determining the first parameter value is a real value in response that the first difference falls within the first deviation range, or receiving a second parameter value of the hardware component, which is acquired by the data acquisition device and follows the first parameter value, in response that the first difference falls outside the first deviation range;

calculating a second prediction value of the second parameter value using the prediction algorithm;

determining if a second difference between the second prediction value and the second parameter value falls within a second deviation range of the second prediction value; and determining the first parameter value is a real value in response that the second difference falls within the second deviation range, or determining the first parameter value is a false value in response that the second difference falls outside the second deviation range.

2. The method of claim 1, further comprising: storing the first parameter value into a corresponding record that is stored in a storage device of the data processing device in response that the first parameter is the real value, or abandoning the first parameter value in response that the first parameter value is the false value.

3. The method of claim 1, wherein the first deviation range is dynamically determined according to the first prediction value and a preset proportion, and the second deviation range is dynamically determined according to the second prediction value and the preset proportion.

4. The method of claim 1, wherein the first deviation range and the second deviation range are a preset fixed value range.

5. A non-transitory medium storing a set of instructions, the set of instructions capable of being executed by a processor of a data processing device for checking parameter values of the data processing device, the method comprising:

receiving a first parameter value of a hardware component of the data processing device acquired by a data acquisition device;

calculating a first prediction value of the first parameter value using a prediction algorithm;

determining if a first difference between the first prediction value and the first parameter value falls within a first deviation range of the first prediction value;

determining the first parameter value is a real value in response that the first difference falls within the first deviation range, or receiving a second parameter value of the hardware component, which is acquired by the data acquisition device and follows the first parameter value, in response that the first difference falls outside the first deviation range;

calculating a second prediction value of the second parameter value using the prediction algorithm;

determining if a second difference between the second prediction value and the second parameter value falls within a second deviation range of the second prediction value; and determining the first parameter value is a real value in response that the second difference falls within the second deviation range, or determining the first parameter value is a false value in response that the second difference falls outside the second deviation range.

6. The medium of claim 5, wherein the method further comprises: storing the first parameter value into a corresponding record that is stored in a storage device of the data processing device in response that the first parameter is the real value, or abandoning the first parameter value in response that the first parameter value is the false value.

7. The medium of claim 5, wherein the first deviation range is dynamically determined according to the first prediction value and a preset proportion, and the second deviation range is dynamically determined according to the second prediction value and the preset proportion.

8. The medium of claim 5, wherein the first deviation range and the second deviation range are a preset fixed value range.

9. A data processing device, comprising:
a storage device;
a processor; and
one or more programs stored in the storage device and being executable by the processor, the one or more programs comprising instructions to:
receive a first parameter value of a hardware component of the data processing device acquired by a data acquisition device;
calculate a first prediction value of the first parameter value using a prediction algorithm;
determine if a first difference between the first prediction value and the first parameter value falls within a first deviation range of the first prediction value;
determining the first parameter value is a real value in response that the first difference falls within the first deviation range, or receive a second parameter value of the hardware component, which is acquired by the data acquisition device and follows the first parameter value, in response that the first difference falls outside the first deviation range;
calculate a second prediction value of the second parameter value using the prediction algorithm;
determine if a second difference between the second prediction value and the second parameter value falls within a second deviation range of the second prediction value; and
determine the first parameter value is a real value in response that the second difference falls within the second deviation range, or determine the first parameter value is a false value in response that the second difference falls outside the second deviation range.

10. The apparatus of claim 9, wherein the one or more programs further comprising instructions to: store the first parameter value into a corresponding record that is stored in a storage device of the data processing device in response that the first parameter is the real value, or abandon the first parameter value in response that the first parameter value is the false value.

11. The apparatus of claim 9, wherein the first deviation range is dynamically determined according to the first prediction value and a preset proportion, and the second deviation range is dynamically determined according to the second prediction value and the preset proportion.

12. The apparatus of claim 9, wherein the first deviation range and the second deviation range are a preset fixed value range.

* * * * *